United States Patent [19]

Hamermesh et al.

[11] 4,086,852

[45] May 2, 1978

[54] LITHOGRAPHIC DAMPENER ROLL HAVING RUBBER SURFACES WITH INCREASED WETTABILITY AND METHOD OF MAKING

[75] Inventors: Charles L. Hamermesh, Tarzana; David H. Kaelble, Thousand Oaks, both of Calif.

[73] Assignee: Rockwell International Corporation, El Segundo, Calif.

[21] Appl. No.: 722,997

[22] Filed: Sep. 13, 1976

[51] Int. Cl.² .................... B05D 3/06; B41L 25/18
[52] U.S. Cl. .................... 101/147; 29/132; 427/39; 427/40; 427/41; 427/307; 427/322
[58] Field of Search .............. 427/38, 39, 40, 41, 427/322, 307; 204/165, 168; 428/520; 101/132.5, 147; 29/132

[56] References Cited

U.S. PATENT DOCUMENTS

| | | | |
|---|---|---|---|
| 3,309,221 | 3/1967 | Smith | 427/40 |
| 3,387,991 | 6/1968 | Erchak | 427/40 |
| 3,761,299 | 9/1973 | Lidel | 427/40 |
| 3,944,709 | 3/1976 | Levy | 427/40 |

*Primary Examiner*—John H. Newsome
*Attorney, Agent, or Firm*—L. Lee Humphries; Craig O. Malin

[57] ABSTRACT

A nitrile-containing material is bonded to the surface of a rubber substrate in order to increase the wettability of the surface. A rubber substrate is placed in the afterglow region of an electrodeless glow-discharge chamber. A nitrile-containing material such as an acrylonitrile monomer is introduced into the chamber, causing the monomer to polymerize and bond to the surface of the rubber substrate. In one embodiment, the surface of the rubber is etched with sulfuric acid prior to bonding the nitrile-containing material to the surface.

8 Claims, 2 Drawing Figures

LITHOGRAPHIC DAMPENER ROLL HAVING RUBBER SURFACES WITH INCREASED WETTABILITY AND METHOD OF MAKING

BACKGROUND OF THE INVENTION

1. Field of the Invention

This invention relates to the field of surface preparation, particularly to the field of surface preparation of rubbers to increase their wettability.

2. Description of the Prior Art

Lithographic printing depends upon the acceptance by the printing plate of ink at certain hydrophobic sites and its rejection at hydrophilic locations. The hydrophilic sites are occupied by water which is provided by a dampener roll which brings water ("fountain solution") to the surface of the plate. Unfortunately, dampener rolls are made of elastomers which are relatively low in wettability and thus poorly receptive to water.

In order to increase the wettability of the rubber surface of the dampener roll and thus provide more water to the plate, a wide variety of additives and roll treatments have been employed. One of the best is sulfuric acid etching of the roller. However, acid etching is not effective for many dampener roller materials and it degrades some materials such as polyurethanes. Additionally, acid etching provides only a limited increase in the wettability of the surface of those materials for which it is effective.

SUMMARY OF THE INVENTION

It is an object of the invention to provide a method for increasing the wettability of rubber and to provide a surface on rubber which has good wettability.

It is a further object of the invention to provide a method for increasing the wettability of rubber and to provide a surface on rubber without degrading the rubber.

An additional object of this invention is to provide dampener rolls for lithographic printers with surfaces having improved receptivity for water.

According to the invention, a nitrile-containing material is bonded to a rubber surface by plasma polymerization. The rubber surface is placed in the afterglow region of an electrodeless glow-discharge chamber. Nitrile-containing material such as an acrylonitrile is introduced into the chamber, causing the monomer to polymerize and bond to the surface of the rubber.

These and other objects and features of the present invention will be apparent from the following detailed description, taken with reference to the accompanying drawings.

DESCRIPTION OF THE PREFERRED EMBODIMENT

Figure 1:
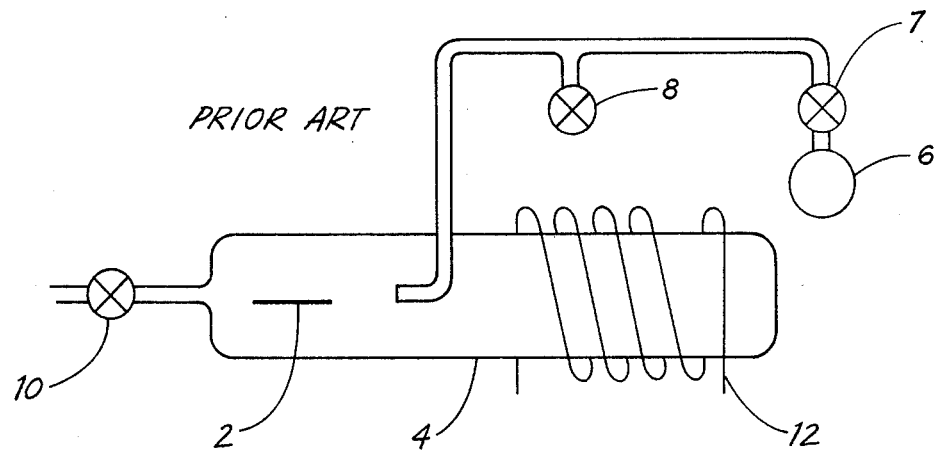
FIG. 1 is a schematic of an electrodeless glow-discharge system (prior art) used to practice the method of the invention.

Plasma chemistry deals with the occurrence of chemical reactions in a partially ionized gas. A wide variety of organic compounds may be polymerized by the plasma process to form organic polymer films, as described in the literature, for example, "Techniques and Applications of Plasma Chemistry", by J. R. Hallahan and A. T. Bell, A Wiley-Interscience Publication, 1974.

In general, polymers prepared by plasma techniques show a hydrophobic surface character and hence are not likely to improve the water-carrying or wettability of the surface. In fact, many hydrophilic monomers will, in a glow-discharge, produce hydrophobic polymers. However, it was found in work leading to the present invention that the wettability of a rubber surface could be increased by plasma polymerizing the nitrile-containing monomer acrylonitrile on the surface of the rubber.

Table I shows the polar surface energy for three different rubber types in four different surface conditions. The higher the polar surface energy, the greater the wettability or water-carrying ability of the surface. Two different blends of both the nitrile-polyvinylchloride and the nitrile rubber were tested. Column 1 shows that the wettability of the as-received surface is low for all three types of rubber. Column 2 shows that the prior art practice of etching the rubber provides a significant increase in wettability. For the example shown, the rubber was immersed in concentrated $H_2SO_4$ for 1-2 minutes at room temperature. The polyurethane type rubber was not acid-etched because the etching degrades the polyurethane.

Column 3 shows the effect of coating the as-received rubber with a very thin layer (170A) of plasma polymerized acrylonitrile. In the case of the nitrile rubber, there is a slight decrease in the wettability. The nitrile-polyvinylchloride (PVC) rubber shows a large increase for material blend #3259 (American Roller Company), and a smaller increase for material blend #9522G (Bingham Rubber Company). However, the polyurethane shows a large increase in wettability. Thus, plasma polymerization of polyurethan with acrylonitrile offers a significant and unexpected increase in wettability which previously could not be obtained because of this material's degradation by prior art acid-etching techniques.

Column 4 of Table I shows the synergistic effect obtained when nitrile-PVC rubber and nitrile rubber are etched with $H_2SO_4$ and then coated with plasma polymerized acrylonitrile. In all cases, the combined increase in wettability greatly exceeded what might be expected simply by adding together the separate effects of both treatments. The particular order of treatment is quite significant in that plasma polymerization, followed by acid-etching, does not produce the unique effect observed when the order of treatment is reversed.

TABLE I

| | POLAR SURFACE ENERGY $\gamma^p$(dyne/cm) | | | |
|---|---|---|---|---|
| Rubber Type | 1 As-Received | 2 After $H_2SO_4$ Treatment | 3 After Plasma Polymerization | 4 After Combined Treatment |
| Nitrile-PVC American Roller Co. #3259 | 2.9 | 9.5 | 29.8 | 44.0 |
| Bingham Rubber | | | | |

TABLE I-continued

| | POLAR SURFACE ENERGY $\gamma^p$(dyne/cm) | | | |
|---|---|---|---|---|
| Rubber Type | 1 As-Received | 2 After $H_2SO_4$ Treatment | 3 After Plasma Polymerization | 4 After Combined Treatment |
| Co. #9522G Nitrile | 1.2 | 17.6 | 5.3 | 29.4 |
| Ideal Roller & Graphics Co. #BN25 | 4.8 | 23.4 | 3.7 | 41.4 |
| Bingham Rubber Co. #5286 | 6.1 | 23.0 | 3.1 | 35.9 |
| Polyurethane | 2.3 | — | 30.7 | — |

Various systems are known for providing polymerization of plasma. A schematic of such a known electrodeless glow-discharge apparatus suitable for practicing the method of the present invention is shown in FIG. 1. The rubber material to be coated is placed in the afterglow region of the reactor chamber 4. The monomer to be introduced into the chamber 4 is released from container 6 through valve 7. Pressure of the monomer being released into the chamber is controlled by pressure transducer 8.

A vacuum pump is connected to the reaction chamber 4 through valve 10. RF power to ionize the monomer and create the plasma is furnished by coil 12 wrapped around a portion of the chamber 4.

While the apparatus described in FIG. 1 has proven satisfactory for practicing the method of the present invention, other apparatus capable of providing a suitable plasma can be utilized within the scope of the invention.

The films shown in Column 3 of Table I were grown in an apparatus such as that shown in FIG. 1. The particular rubbers used for these examples were placed in the afterglow region 2 of chamber 4. The monomer, acrylonitrile, was introduced into the reactor chamber 4 through pressure transducer 8 at a monomer pressure of 140 μm Hg. An RF power of 3 watts was applied to create the plasma. Under these conditions it was found from ellipsometric measurements of films deposited on aluminum samples that the deposition rate for plasma polyacrylonitrile films was approximately 17A/min.

Figure 2:
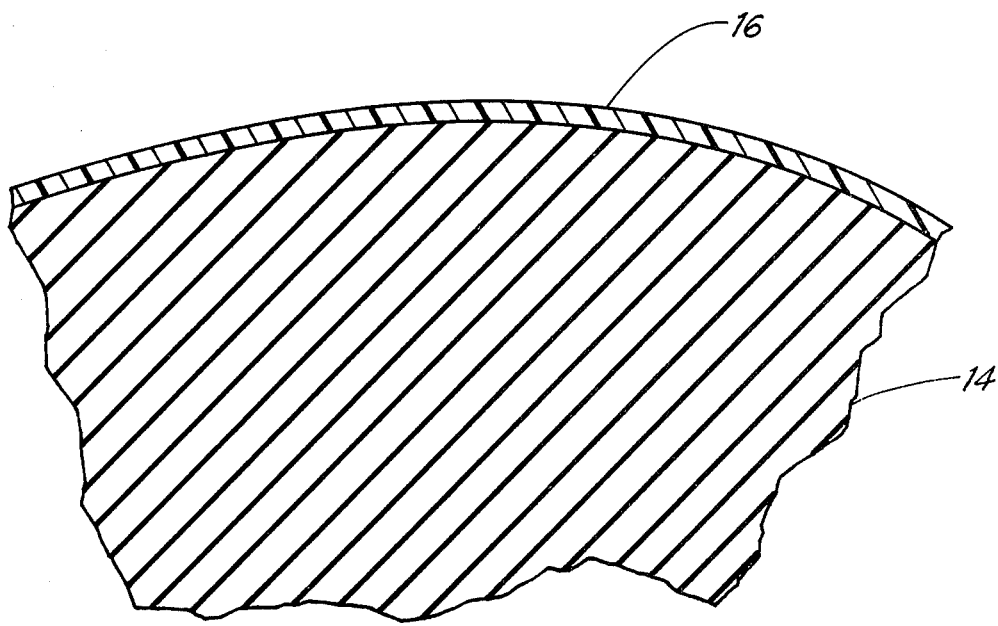
FIG. 2 is an illustration, at a greatly enlarged scale, of a cross section of a portion of a rubber dampener roll having a coating of plasma polymerized acrylonitrile thereon.

FIG. 2 illustrates, at a greatly enlarged scale, a cross section of a portion of a rubber dampener roll 14 having a coating 16 of plasma polymerized nitrile-containing material approximately 170A thick. The nature of the bond between the nitrile layer 16 and the rubber substrate 14 is not precisely known, although it does appear to be predominantly a chemical bond rather than a physical bond.

The invention is applicable to rubbers other than those shown in Table I. For example, other rubbers, such as butadiene homopolymers and copolymers, isoprene homopolymers and copolymers, and butyle are applicable. Likewise, nitrile-containing monomers such as methacrylonitrile, propionitrile, and acetonitrile, in addition to the exemplary acrylonitrile, are suitable for practicing the method of the invention.

Numerous variations and modifications may be made without departing from the present invention. Accordingly, it should be clearly understood that the form of the present invention described above and shown in the accompanying drawings is illustrative only and is not intended to limit the scope of the present invention.

What is claimed is:

1. A method of coating the surface of a dampener roll for a lithographic printing machine, comprising:

providing a dampener roll having a surface selected from the group consisting of nitrile rubber and nitrile-PVC rubber;

etching said surface with sulfuric acid;

placing said surface in the afterglow region of an electrodeless glow-discharge chamber; and introducing acrylonitrile into said chamber, whereby a film of plasma polymerized acrylonitrile is formed on the acid-etched surface.

2. A method of coating the surface of an elastomeric substrate to improve the wettability of the surface comprising:

providing a substrate of rubber selected from the group consisting of nitrile type rubber and nitrile-PVC type rubbers;

etching a surface of said substrate with sulfuric acid;

exposing said surface of said substrate to a plasma of nitrile-containing material, whereby a film of plasma polymerized, nitrile-containing material is bonded to said substrate.

3. The method as claimed in claim 2, wherein said elastomeric substrate comprises a dampener roll for a lithographic printing machine.

4. A method of coating the surface of an elastomeric substrate to improve the wettability of the surface comprising:

providing a substrate of rubber selected from the group consisting of nitrile, nitrile-PVC, butadiene homopolymer, butadiene copolymer, isoprene homopolymer, isoprene copolymer, and butyl;

etching a surface of said substrate with sulfuric acid;

exposing said surface of said substrate to a plasma of nitrile-containing material, whereby a film of plasma polymerized, nitrile-containing material is bonded to said substrate.

5. The method as claimed in claim 4, wherein said elastomeric substrate comprises a dampener roll for a lithographic printing machine.

6. In combination:

a dampener roll for a lithographic printing machine, said dampener roll having an acid-etched surface of rubber selected from the group consisting of nitrile rubber and nitrile-PVC rubber; and a film of plasma polymerized nitrile-containing material bonded to said surface of said dampener roll.

7. In combination:

an acid-etched surface of rubber selected from the group consisting of nitrile rubber and nitrile-PVC rubber; and a film of plasma polymerized nitrile-containing material on said acid-etched surface of rubber.

8. The combination as claimed in claim 7, wherein said acid-etched surface comprises the surface of a dampener roll for a lithographic printing machine.

* * * * *